No. 693,011. Patented Feb. 11, 1902.
F. M. HAWK.
WHEEL.
(Application filed May 9, 1901.)

(No Model.)

WITNESSES,
Thomas L. Ryan
Jas A. Harvey

INVENTOR,
Francis M. Hawk
by
Wm DuVal Brown
ATTORNEY.

THE NORRIS PETERS CO., PHOTO-LITHO., WASHINGTON, D. C.

UNITED STATES PATENT OFFICE.

FRANCIS M. HAWK, OF MUNCIE, INDIANA.

WHEEL.

SPECIFICATION forming part of Letters Patent No. 693,011, dated February 11, 1902.

Application filed May 9, 1901. Serial No. 59,389. (No model.)

*To all whom it may concern:*

Be it known that I, FRANCIS M. HAWK, a citizen of the United States, residing at Muncie, in the county of Delaware and State of Indiana, have invented a new and useful Wheel, of which the following is a specification.

The aim and purpose of this invention is to provide a wheel with metal spokes to take the place of the ordinary wooden spokes without changing the construction of the hub and but slightly changing the construction of the rim.

A further object is to arrange these metal spokes in the same manner as the wooden spokes, so that they can be secured to the ordinary wooden or any kind of hub without changing the construction of the same.

A still further object is to arrange the spokes vertically as wooden spokes are arranged and not at a tangent and at the same time provide means for securing the inner ends of the spokes to the hub and also provide means for securing the outer ends of the spokes to the rim, so that the spokes will be locked to the rim on both sides and also be easily adjusted thereon.

These and other objects not hereinbefore mentioned are accomplished by the construction illustrated in the accompanying drawings, wherein like characters of reference indicate corresponding parts in the several views, and in which—

Figure 1:
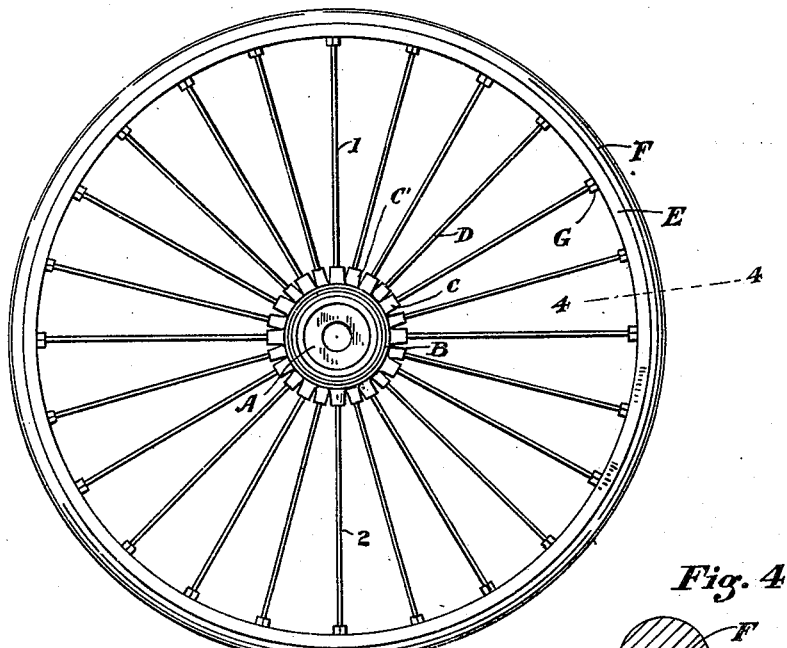
Figure 2:
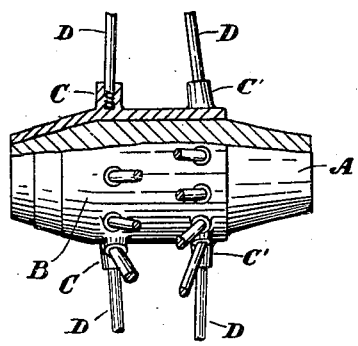
Figure 5:
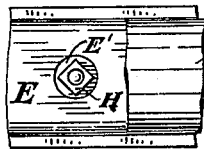
Figure 4:
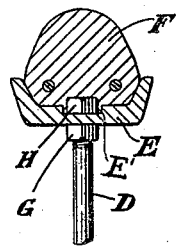
Figure 6:
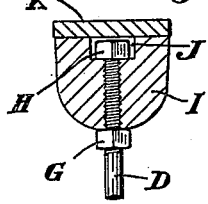
Figure 3:
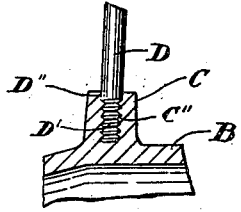

Figure 1 is a side elevation of my improved wheel. Fig. 2 is a side elevation of an ordinary hub with a shell-band secured thereto, the upper portion being in section. Fig. 3 is a detail enlarged view of a portion of the shell-band, showing the manner of securing the lower end of the spoke therein. Fig. 4 is a section on the line 4 4, Fig. 1. Fig. 5 is a top plan view of a portion of the rim, showing the tire broken away over the securing means for the upper end of one of the spokes; and Fig. 6 is a cross-section through an ordinary wooden felly and tire, showing my means for securing the upper ends of the spokes thereto.

In the drawings, A designates an ordinary wooden hub, and B a shell-band secured thereto in the usual well-known manner. This shell-band is provided on its periphery with two parallel annular series of projections C C'. These projections are hollow and are screw-threaded on their interior from the bottom up to a point somewhat below the top, as more plainly shown at C'', Fig. 3.

D designates the spokes. These spokes are made of wire of sufficient strength. The lower ends of the spokes are screw-threaded, as shown at D', Fig. 3. The length of this screw-threaded portion D' exactly corresponds with the length of the screw-threaded portion C'' in the interior of the projections C C'. By this construction when the lower end of the spoke is screwed into the interior of the projection there will be a smooth portion D'' adjacent to and extending to the top of the projection, as plainly shown in Fig. 3. As a great deal of the strain on the spoke and projections is at this point, I regard it an important feature of my invention to dispense with the threads at this point and present a smooth surface. If the threads extended up to the top of the projections, the threads would weaken the parts where the greatest strain is located.

E designates a channel-rim, in which a rubber tire F is secured in the usual manner. At the points where the upper ends of the spokes pass through the channel is provided with a circular countersunk portion E'. The upper ends of the spokes are secured to the channel by means of two nuts—the nut G, below the channel, bearing against the bottom portion of the channel, and the nut H, within the countersunk portion E', bearing against the top of the channel. By the use of these two nuts the channel can be accurately trued onto the spokes very easily, and the two nuts bearing against the opposite sides of the channel will absolutely prevent any movement of the spokes through the channel in either direction. By referring to Fig. 1 it will be seen that the spokes are arranged vertically between the periphery of the hub and channel, so that the strain on the spoke 1 will be downward, making a certain amount on the nut H, and the strain on the spoke 2 upward, making an equal strain on the spoke G. By this construction the strain on the two nuts is equalized at all times, so that the channel cannot be jarred out of true in going over rough roads.

By referring to Fig. 4 it will be seen that the upper nut extends up slightly above the surface of the channel and is embedded in the rubber. By this construction two results are accomplished—first, the nut being embedded in the rubber will prevent the rubber from slipping on the channel, and, second, the rubber surrounding the nut will act as a lock and prevent the nut from turning.

By making the countersunk portion E' round, as shown, I can readily place therein a tappet-wrench for turning the nut.

In Fig. 6 I show an ordinary wooden felly I and metal flat tire K. The felly is provided with a countersunk portion J, in which is placed the nut H on the upper end of the spoke D. This countersunk portion is deep enough to hold the nut so that it will not interfere with the tire K. The spoke is also provided with the nut G, bearing against the bottom of the felly, as in the other construction.

I am aware that minor changes can be made in the construction and arrangement of parts without in the least departing from the nature and principles of my invention.

Having thus described my invention, what I claim as new, and desire to secure by Letters Patent, is—

1. In a wheel, the combination with the rim, the rim being provided with a series of countersunk portions spaced apart, of spokes having their outer ends passing through the countersunk portions of the rim and their inner ends secured to the hub, screw-threads on the outer ends of the spokes, and a pair of nuts for each spoke engaging the threads, one nut being adapted to be screwed up against the bottom of the rim, and the other nut being adapted to be screwed down against the top of the rim and being positioned in one of the countersunk portions of the rim.

2. In a wheel, the combination with a hub and channel-rim, of spokes secured to the hub, countersunk portions on the top of the rim through which pass the outer ends of the spokes, nuts on the ends of the spokes in the countersunk portion bearing against the top of the rim, the upper portion of the nuts extending slightly above the surface of the rim.

In testimony whereof I have hereunto affixed my signature in the presence of two witnesses.

FRANCIS M. HAWK.

Witnesses:
WM. DU VAL BROWN,
C. C. PAVEY.